United States Patent
Song et al.

(10) Patent No.: US 11,863,267 B2
(45) Date of Patent: Jan. 2, 2024

(54) MULTI-ANTENNA CHANNEL ESTIMATION APPARATUS AND METHOD FOR BEAMFORMING

(71) Applicant: INDUSTRY ACADEMY COOPERATION FOUNDATION OF SEJONG UNIVERSITY, Seoul (KR)

(72) Inventors: Hyoung Kyu Song, Seongnam-si (KR); Won Seok Lee, Seoul (KR); Ji Sung Jung, Seoul (KR)

(73) Assignee: INDUSTRY ACADEMY COOPERATION FOUNDATION OF SEJONG UNIVERSITY

( * ) Notice: Subject to any disclaimer, the term of this patent is extended or adjusted under 35 U.S.C. 154(b) by 19 days.

(21) Appl. No.: 17/500,918

(22) Filed: Oct. 13, 2021

(65) Prior Publication Data
US 2022/0376755 A1 Nov. 24, 2022

(30) Foreign Application Priority Data

Apr. 29, 2021 (KR) .......................... 10-2021-0056046

(51) Int. Cl.
*H04B 7/06* (2006.01)
*H04B 7/08* (2006.01)
(Continued)

(52) U.S. Cl.
CPC ........... *H04B 7/0617* (2013.01); *H04B 7/086* (2013.01); *H04L 5/0048* (2013.01); *H04L 25/0202* (2013.01)

(58) Field of Classification Search
CPC .... H04B 7/0617; H04B 7/086; H04B 7/0456; H04B 7/0639; H04L 5/0048;
(Continued)

(56) References Cited

U.S. PATENT DOCUMENTS 8,582,674 B2 * 11/2013 Yu .................. H04L 25/0234
375/260
8,644,402 B2 * 2/2014 Abrishamkar ...... H04L 25/0234
375/267
(Continued)

FOREIGN PATENT DOCUMENTS

CA 2797174 A1 * 5/2008 ........... H04B 7/0413
CA 2665459 C * 1/2013 ........... H04B 7/0413
(Continued)

OTHER PUBLICATIONS

KR20160100806, (Machine Translated using Korean Intellectual Property Office (KIPO) ), Publication Date: Dec. 31, 2014 (Year: 2014).*

(Continued)

Primary Examiner — Berhanu Tadese
(74) Attorney, Agent, or Firm — Renaissance IP Law Group LLP

(57) ABSTRACT

The present invention relates to a multi-antenna channel estimation apparatus and method for performing beamforming in a communication system in which only single channel estimation is possible, and relates to a channel estimation apparatus and method for beamforming in which the transmitter generates pilot signals based on the Zadoff-Chu sequence and transmits the generated pilot signals to the receiver, the receiver estimates a channel based on the pilot signal, and feeds back information for beamforming to the transmitter based on the estimated channel information, and it is configured to enable beamforming by converting and setting the signal phase for each antenna according to the feedback received from the transmitter.

19 Claims, 7 Drawing Sheets

(51) Int. Cl.
*H04L 5/00* (2006.01)
*H04L 25/02* (2006.01)

(58) Field of Classification Search
CPC ............ H04L 25/0202; H04L 27/2613; H04L 5/0026; H04L 25/0226; H04L 25/0224
See application file for complete search history.

(56) References Cited

U.S. PATENT DOCUMENTS

| | | | | |
|---|---|---|---|---|
| 8,665,971 | B2* | 3/2014 | Abrishamkar | H04L 25/0234 375/260 |
| 8,830,818 | B2* | 9/2014 | Damnjanovic | H04W 36/30 370/329 |
| 8,867,643 | B2* | 10/2014 | Kobayashi | H04B 17/391 375/224 |
| 9,191,079 | B2* | 11/2015 | Wu | H04B 7/0613 |
| 9,215,118 | B2* | 12/2015 | Kusunoki | H04B 17/14 |
| 9,325,398 | B2* | 4/2016 | Negus | H01Q 1/246 |
| 9,331,846 | B2* | 5/2016 | Kusunoki | H04L 7/042 |
| 9,451,536 | B2* | 9/2016 | Ryu | H04W 72/046 |
| 9,473,229 | B2* | 10/2016 | Yin | H04L 25/067 |
| 9,866,299 | B2* | 1/2018 | Guey | H04L 5/0023 |
| 10,135,508 | B2* | 11/2018 | Won | H04B 7/0617 |
| 10,461,877 | B2* | 10/2019 | Han | H04L 27/2613 |
| 10,555,309 | B2* | 2/2020 | Chae | H04B 7/0413 |
| 10,560,229 | B2* | 2/2020 | Xiong | H04L 1/18 |
| 10,571,224 | B2* | 2/2020 | Holder | F41G 7/303 |
| 10,797,771 | B2* | 10/2020 | Chang | H04L 5/005 |
| 10,868,627 | B2* | 12/2020 | Han | H04L 5/0094 |
| 10,958,386 | B2* | 3/2021 | Xiong | H04L 1/1861 |
| 10,980,022 | B2* | 4/2021 | Zeng | H04L 5/0048 |
| 10,986,622 | B2* | 4/2021 | Zhang | H04L 5/0094 |
| 11,353,290 | B2* | 6/2022 | Holder | G01S 13/42 |
| 11,395,251 | B2* | 7/2022 | Viorel | H04B 7/0617 |
| 2011/0158330 | A1* | 6/2011 | Huang | H04L 1/20 375/259 |
| 2011/0249648 | A1* | 10/2011 | Jen | H04L 5/0035 455/509 |
| 2012/0106474 | A1* | 5/2012 | Wu | H04B 7/0619 370/329 |
| 2017/0006638 | A1* | 1/2017 | Sahlin | H04J 13/0003 |
| 2017/0238271 | A1* | 8/2017 | Viorel | H04B 7/024 370/350 |
| 2017/0314892 | A1* | 11/2017 | Holder | G01S 13/42 |
| 2020/0045663 | A1* | 2/2020 | Manolakis | H04W 56/0015 |
| 2020/0191529 | A1* | 6/2020 | Holder | G01S 13/42 |
| 2020/0336270 | A1* | 10/2020 | Lu | H04J 13/0062 |
| 2020/0373983 | A1* | 11/2020 | Bengtsson | H04B 7/088 |
| 2021/0076367 | A1* | 3/2021 | Bayesteh | H04W 4/70 |
| 2021/0127351 | A1* | 4/2021 | Stojanovski | H04W 48/16 |
| 2021/0168779 | A1* | 6/2021 | Mondal | H04L 5/0035 |
| 2021/0168852 | A1* | 6/2021 | Panteleev | H04L 5/0098 |
| 2021/0185722 | A1* | 6/2021 | Li | H04L 5/0083 |
| 2021/0194652 | A1* | 6/2021 | Khoryaev | H04L 5/0048 |
| 2021/0194740 | A1* | 6/2021 | Aldana | H04W 72/1215 |
| 2021/0195541 | A1* | 6/2021 | Wei | H04W 56/005 |
| 2021/0203397 | A1* | 7/2021 | Xiong | H04W 72/046 |
| 2021/0227442 | A1* | 7/2021 | Yiu | H04W 36/00837 |
| 2021/0227490 | A1* | 7/2021 | Yiu | H04W 48/12 |
| 2021/0297199 | A1* | 9/2021 | Miao | H04L 1/1896 |
| 2022/0014252 | A1* | 1/2022 | Harrison | H04B 7/0691 |
| 2022/0053385 | A1* | 2/2022 | Li | H04W 36/0069 |
| 2022/0078801 | A1* | 3/2022 | Huang | H04W 76/15 |
| 2022/0086740 | A1* | 3/2022 | Li | H04B 7/088 |
| 2022/0103207 | A1* | 3/2022 | Miao | H04B 7/024 |
| 2022/0110138 | A1* | 4/2022 | Miao | H04L 1/0072 |
| 2022/0110181 | A1* | 4/2022 | Miao | H04L 1/1822 |
| 2022/0116089 | A1* | 4/2022 | Khoryaev | H04W 64/00 |
| 2022/0132349 | A1* | 4/2022 | Li | H04B 7/0417 |
| 2022/0132527 | A1* | 4/2022 | Cui | H04W 72/569 |
| 2022/0210675 | A1* | 6/2022 | Cui | H04W 36/0069 |
| 2022/0376755 | A1* | 11/2022 | Song | H04L 27/2613 |

FOREIGN PATENT DOCUMENTS

| | | | | |
|---|---|---|---|---|
| CN | 102118345 | A * | 7/2011 | ......... B60K 31/0058 |
| CN | 102412881 | A * | 4/2012 | .......... H04B 7/0408 |
| CN | 102468879 | A * | 5/2012 | .......... H04B 7/0617 |
| CN | 102468879 | B * | 8/2015 | .......... H04B 7/0617 |
| CN | 106105361 | A * | 11/2016 | .......... H04J 13/0003 |
| CN | 108063631 | A * | 5/2018 | ............ H04B 7/024 |
| CN | 111355521 | A * | 6/2020 | ............ H04B 17/00 |
| CN | 109257309 | B * | 1/2021 | .......... H04B 7/0413 |
| CN | 111313941 | B * | 4/2022 | .......... H04B 7/0413 |
| EP | 2375616 | A1 * | 10/2011 | .......... H04B 7/0404 |
| JP | 2012100258 | A * | 5/2012 | .......... H04B 7/0617 |
| JP | 2012105321 | A * | 5/2012 | .......... H04B 7/0413 |
| JP | 4965662 | B2 * | 7/2012 | .......... H04B 7/0413 |
| JP | 5199451 | B2 * | 5/2013 | .......... H04B 7/0413 |
| JP | 5504237 | B2 * | 5/2014 | .......... H04B 7/0617 |
| KR | 20160100806 | * | 8/2016 | .......... H04B 7/0617 |
| KR | 20160100806 | A | 8/2016 | |
| KR | 101888162 | B1 | 8/2018 | |
| KR | 102072751 | B1 | 2/2020 | |
| KR | 102175720 | B1 | 11/2020 | |
| KR | 102208122 | B1 | 1/2021 | |
| KR | 2301131 | B1 * | 9/2021 | .......... H04B 7/0617 |
| TW | 200835189 | A * | 8/2008 | .......... H04B 7/0413 |
| TW | 201125325 | A * | 7/2011 | ......... H04L 25/0234 |
| TW | 201125382 | A * | 7/2011 | ......... H04L 25/0234 |
| WO | WO-9959263 | A1 * | 11/1999 | .......... H04B 7/0604 |
| WO | WO-2011066271 | A1 * | 6/2011 | ........ H04L 25/0234 |
| WO | WO-2011066290 | A1 * | 6/2011 | ........ H04L 25/0234 |
| WO | WO-2011066296 | A1 * | 6/2011 | ........ H04L 25/0234 |
| WO | WO-2012037769 | A1 * | 3/2012 | .......... H04B 7/0408 |
| WO | WO-2015144256 | A1 * | 10/2015 | .......... H04J 13/0003 |
| WO | WO-2020125557 | A1 * | 6/2020 | ............ H04B 17/00 |
| WO | WO-2021221547 | A1 * | 11/2021 | ......... H04L 25/0204 |

OTHER PUBLICATIONS

KR20160100806, (Original Patent, from Korean Intellectual Property Office (KIPO) ), Publication Date: Dec. 31, 2014.*
Park et al. Single-Antenna-Based GPS Antijamming Method Exploiting Polarization Diversity, IEEE Apr. 2021.*
Zadoff-Chu sequence—Wikipedia.*
S. He et al., Codebook-Based Hybrid Precoding for Millimeter Wave Multiuser Systems, IEEE 2017.*

* cited by examiner

MULTI-ANTENNA CHANNEL ESTIMATION APPARATUS AND METHOD FOR BEAMFORMING

CROSS-REFERENCE TO RELATED APPLICATION

This application claims priority to Korean Patent Application No. 10-2021-0056046 filed on Apr. 29, 2021 and all the benefits accruing therefrom under 35 U.S.C. § 119, the contents of which are incorporated by reference in their entirety.

TECHNICAL FIELD

The present invention relates to a multi-antenna channel estimation apparatus and method for beamforming, and more specifically to a Zadoff-Chu sequence-based multi-antenna channel estimation apparatus and method for performing beamforming in a communication system using a single reception antenna-based standard.

BACKGROUND ART

Modern wireless communication technology is being used in various applications, and its usage is also steadily increasing, so that the frequency band below 3 GHz used for the existing wireless communication is reaching saturation. Accordingly, in recent years, in order to solve the bandwidth shortage caused by the saturation of the frequency band, technologies for using a frequency domain of a millimeter band higher than 3 GHz are being actively studied.

As one of the technologies being studied to compensate for the high path loss that occurs in millimeter-band signals, there is a beamforming technology that concentrates the beam of the transmission antenna in the direction of a specific angle/position so that the power of the transmitter's transmission signal may be received by the receiver at a high level.

A method of implementing such beamforming is largely divided into a mechanical method and a method using signal processing. Mechanical beamforming is a method of using a directional antenna that strongly radiates or receives radio waves in one direction, and mechanically rotates an antenna with strong directivity among antennas so that strong radio waves are radiated or received in a desired direction. Beamforming using signal processing is a method of amplifying radio waves by generating a phase difference in signals propagated or received by a plurality of antennas using a plurality of antennas having low directivity. More specifically, the same signal radiated from a plurality of antennas is emitted by being summed in the same phase in a specific direction due to a phase difference between the signals, and the power of radio waves is increased in proportion to the number of antennas due to the sum of the signals of the same phase. The same phenomenon occurs due to a phase difference between radio waves received by a plurality of antennas on the receiving side as well, so that the receiving side may receive a high-power signal at a specific angle/position.

In order to perform beamforming in which the power of the transmission signal is concentrated at a desired angle/position of the receiving side, channel estimation must be used. Channel estimation is a technique for obtaining information for recovering a signal by measuring a phenomenon that is distorted due to a physical channel through which a signal is transmitted in the system and generally uses a method in which a transmitting side and a receiving side transmit a pilot signal to measure distorted information. The pilot signal refers to a signal previously agreed between the transmitting side and the receiving side. The channel information measured from the pilot signal is used to reconstruct a signal transmitted in a similar time, frequency, and spatial domain, and this may be performed by a method of transmitting with compensation in advance on the transmitting side and a method of compensating for a distorted signal on the receiving side. A communication system that transmits different signals using a plurality of antennas needs to know channel information between all transmission/reception antennas. For this, a pilot signal is transmitted between each pair of transmission/reception antennas in a way that is separable from each other. In LTE, that is, the 4th generation mobile communication technology, a method of transmitting pilot signals transmitted to multiple antennas by dividing them into time and frequency domains was used, and in New Radio (NR), that is, a fifth-generation mobile communication technology that has recently been standardized, a pilot signal is transmitted by adding a method using an orthogonal code to the two methods.

However, among currently used wireless communication standards, there are standards designed without considering beamforming. Representatively, there are Advanced Television Systems Committee (ATSC) and Digital Video Broadcasting (DVB), which are standards for broadcast communication, and 802.11p, which is a standard for communication between mobile devices such as vehicles. Since the standards consider only a single reception antenna transmission, a pilot signal is transmitted to estimate a channel through only one antenna. In recent years, since the transmission channels of many communication systems are moving to the frequency band of 3 GHz or higher due to the problem of insufficient bandwidth, communication systems between broadcasting and vehicles or unmanned moving vehicles may also move to millimeter bands in order to secure a wide bandwidth.

However, in the case of a communication standard that does not provide a channel estimation technique for a multi-antenna channel, since channel estimation is not performed, there is a problem in that it is difficult to apply a beamforming technique to solve a path loss problem.

PRIOR ART LITERATURE

Patent Literature

Korean Patent Publication No. 10-1888162

DISCLOSURE OF THE INVENTION

Technical Problem

An object of the present invention is to solve the above problems, and to provide a multi-antenna channel estimation apparatus and method for performing beamforming in a communication system in which only a single reception antenna channel estimation is possible.

Technical Solution

A channel estimation apparatus for performing beamforming in a communication system using a single antenna-based standard according to the present invention includes: a transmitter equipped with at least two transmission antennas, and configured to generate a predetermined number of transmission pilot signals equal to the number of the provided transmission antennas to transmit the generated predetermined number of transmission pilot signals to the receiver, and receive the phase shift information corresponding to the pilot signals as feedback from the receiver to adjust a signal phase for each transmission antenna using the fed back phase shift information; and a receiver equipped with a single reception antenna, and configured to estimate a channel for beamforming based on the transmission pilot signals transmitted from the transmitter, and detect an optimal precoding vector to be applied from the transmitter based on the estimated channel information and the pre-stored codebook to feed back the corresponding phase shift information to the transmitter.

In detail, the transmitter includes: a transmission communication module configured to generate a frame including predetermined beamforming information and transmit the generated frame to multiple transmission antennas through a phase shift network; a pilot signal generation module configured to generate a Zadoff-Chu sequence based on a predetermined signal generation parameter from the transmission control module, and generate a predetermined number of transmission pilot signals equal to the number of transmission antennas provided in the transmitter using the generated Zadoff-Chu sequence; a signal switching switch configured between the transmission communication module and the pilot signal generation module and the phase shift network to connect the transmission communication module or the pilot signal generation module to a phase shift network according to the control of the transmission control module; a phase shift network including phase shifters corresponding to the respective transmission antennas, and configured to transmit an output signal from the transmission communication module or the pilot signal generation module connected through the signal switching switch to the connected multiple transmission antenna; a multiple transmission antenna connected to the phase shift network and configured to radiate an output signal transmitted from the phase shift network to a receiver; and a transmission control module configured to obtain phase shift information corresponding to the transmission pilot signals generated in the pilot signal generation module through the control of the transmission communication module, the pilot signal generation module and the signal switching switch from the receiver, and adjust the phase delay of each signal of the phase shift network using the acquired phase shift information.

The pilot signal generation module includes: a Zadoff-Chu sequence generation module configured to receive a predetermined signal generation parameter from the transmission control module and generates a Zadoff-Chu sequence by the following (Equation 1) based on this; and a transmission pilot signal generation module configured to generate the same number of transmission pilot signals as the number of transmission antennas connected to the phase shift network by the following (Equation 2) based on the Zadoff-Chu sequence generated in the Zadoff-Chu sequence generation module, wherein the generated transmission pilot signals is transmitted to the phase shift network through the signal switching switch, $$z_q(k) = e^{-j\pi q \frac{k(k+1)}{N_{ZC}}}, k = 0, 1, 2, \ldots, N_{ZC} - 1 \quad \text{(Equation 1)}$$

($z_c(k)$: Zadoff-Chu sequence generated based on signal generation parameters, k: sample order of the sequence, $N_{ZC}$: length of the generated sequence (signal), q: a variable that determines the characteristics of the sequence using a prime number smaller than $N_{ZC}$)

$$p_n(k) = z_q(\{k - n\lfloor N_{zc}/N_{tx}\rfloor\} \bmod N_{zc}), \quad \text{(Equation 2)}$$
$$k = 0, 1, \ldots N_{zc} - 1, n = 0, 1, \ldots N_{tx} - 1$$

($p_n(k)$: transmission pilot signal of the n-th transmission antenna generated based on the Zadoff-Chu sequence, $\lfloor \ \rfloor$: rounding down operation, $N_{tx}$: total number of transmission antennas connected to the phase shift network)

Moreover, the transmission control module includes: a signal generation parameter generation module configured to generate a predetermined signal generation parameter for generating a Zadoff-Chu sequence and transmits the generated predetermined signal generation parameter to the pilot signal generation module; a signal switching switch control module configured to control a switching operation of the signal switching switch to connect the pilot signal generation module or the transmission communication module to the phase shift network; a precoding vector extraction module configured to receive the phase shift information corresponding thereto from the receiver that receives transmission pilot signals and beamforming information by the pilot signal generation module and the transmission communication module to extract a corresponding precoding vector from a pre-stored codebook using the phase shift information; and a phase delay value setting module configured to set a phase delay value of each of the phase shifters of the phase shift network as a phase delay value corresponding to each transmission antenna included in the precoding vector extracted from the precoding vector extraction module.

Here, the signal switching switch control module, when a communication protocol is started, output a pilot signal generation module connection signal to the signal switching switch to connect the pilot signal generation module to the phase shift network, and when transmission of the transmission pilot signals to the receiver is completed, output a transmission communication module connection signal to the signal switching switch to connect the transmission communication module to the phase shift network.

Furthermore, the transmitter further includes a transmission memory module configured to store in advance a codebook including at least two or more precoding vectors including a phase delay value for each transmission antenna connected to the phase shift network calculated by (Equation 3) below.

$$w_i = \begin{bmatrix} 1 \\ e^{j\theta_2(i)} \\ \vdots \\ e^{j\theta_{N_{tx}}(i)} \end{bmatrix} \quad \text{(Equation 3)}$$

($w_i$: precoding vector, i: codebook number)

Moreover, the receiver includes: a reception communication module configured to perform frame synchronization to obtain predetermined beamforming information included in a frame transmitted from the transmitter, and receive transmission pilot signals from the transmitter using the obtained beamforming information; a channel estimation module configured to, when the beamforming use of the transmitter is confirmed using the beamforming information obtained from the reception communication module, generate reception pilot signals based on the received transmission pilot signals and estimate a channel using the transmission pilot signals and the reception pilot signals; an optimal precoding vector detection module configured to detect an optimal precoding vector to be applied to the transmitter from among precoding vectors included in a pre-stored codebook by using the channel information estimated by the channel estimation module; a transmission/reception switching switch configured between the reception communication module and the single reception antenna to switch a transmission/reception state of the reception communication module for the single reception antenna; a reception control module configured to switch a transmission/reception state of the reception communication module by controlling a switching operation of the transmission/reception switching switch; and a reception memory module configured to store in advance a codebook including at least two or more precoding vectors including a phase delay value for each transmission antenna connected to the transmitter calculated by the following (Equation 3).

$$w_i = \begin{bmatrix} 1 \\ e^{j\theta_2(i)} \\ \vdots \\ e^{j\theta_{N_{tx}}(i)} \end{bmatrix} \quad \text{(Equation 3)}$$

($w_i$: precoding vector, i: codebook number)

In detail, the channel estimation module includes: a reception pilot signal generation module configured to generate reception pilot signals by using beamforming information from the transmitter obtained by the reception communication module; and a calculation module configured to perform a channel estimation operation by the following (Equation 5) using transmission pilot signals from the transmitter received by the reception communication module and reception pilot signals generated by the reception pilot signal generation module.

$$\sum_{n=0}^{N-1} \frac{1}{\rho} y(n) p^H(n) = \hat{h_0^T} \quad \text{(Equation 5)}$$

($\hat{h_0^T}$: estimated channel, $\rho$: constant for normalization, $p^H(n)$: a value obtained by performing a Hermitian operation on p(n), $$y(n) = \sum_{l=0}^{L-1} h_l^T p(n-l), h_l \in \mathbb{C}^{N_{tx} \times 1}, p(n) \in \mathbb{C}^{N_{tx} \times 1}:$$

a transmission pilot signal received from a single reception antenna, p(n): a pilot including samples of the transmission pilot signal of each transmission antenna vector, $h_l$: the channel vector of the l-th path among multipath channels)

Moreover, detecting an optimal precoding vector among precoding vectors included in a pre-stored codebook using the estimated channel information in the optimal precoding vector detection module is performed by the following (Equation 6), wherein phase shift information corresponding to the detected optimal precoding vector is transmitted to a transmitter through the reception communication module.

$$i_{opt} = \underset{i}{\operatorname{argmax}} \hat{h_0^T} w_i \quad \text{(Equation 6)}$$

($i_{opt}$: codebook number indicating the optimal precoding vector, $\hat{h_0^T}$: estimated channel, $w_i$: precoding vector, i: codebook number)

Here, the optimal precoding vector is a precoding vector that allows the receiver to receive the transmission signal from the transmitter with the highest power.

Moreover, the predetermined beamforming information includes whether the transmitter uses beamforming, the number of transmission antennas, and a signal generation parameter for generating a Zadoff-Chu sequence.

Furthermore, the transmission control module is configured to set the phase delay values of all phase shifters of the phase shift network as a predetermined initial phase delay value in an initial state in which a communication protocol is started.

In addition, the phase shift information is a codebook number corresponding to the optimal precoding vector.

A channel estimation method for performing beamforming in a communication system using a single antenna-based standard according to the present invention include: an initial phase delay value setting step of setting phase delay values of all phase shifters configured in a phase shift network as a predetermined initial phase delay value in a transmitter to which the multiple transmission antenna is connected when the communication protocol is started; a pilot signal generation step of generating a Zadoff-Chu sequence based on a predetermined signal generation parameter, and generating a predetermined number of transmission pilot signals equal to the number of the multiple transmission antennas using the generated Zadoff-Chu sequence, in the transmitter; a pilot signal transmission step of transmitting the transmission pilot signals generated in the pilot signal generation step to the receiver, in the transmitter; a frame generation step of generating a frame including predetermined beamforming information and transmitting the generated frame to a multiple transmission antenna through the phase shift network, in the transmitter; a frame and pilot signal reception step of obtaining beamforming information included in the frame generated by the transmitter in the frame generation step through frame synchronization, and receiving the transmission pilot signals using the obtained beamforming information, in the receiver to which a single reception antenna is connected; a channel estimation step of generating reception pilot signals based on the received transmission pilot signals and estimating a channel using the transmission and reception pilot signals in the receiver when the beamforming use of the transmitter is confirmed from the beamforming information obtained in the frame and pilot signal reception step; an optimal precoding vector detection step of detecting an optimal precoding vector to be applied by a transmitter among precoding vectors included in a pre-stored codebook by using the channel information estimated in the channel estimation step, in the receiver; a codebook number feedback step of feeding back a codebook number corresponding to the optimal precoding vector detected in the optimal precoding vector detection step to the transmitter through a single reception antenna, in the receiver; and a phase delay value conversion setting step of converting a signal phase of extracting the corresponding precoding vector from the codebook stored in advance using the codebook number fed back from the receiver through the codebook number feedback step, and converting a signal phase of each transmission antenna into a phase delay value corresponding to each transmission antenna included in the extracted precoding vector, in the transmitter.

In detail, the pilot signal generation step includes: a switch control step of controlling a signal switching switch configured between a transmission communication module and a pilot signal generation module and a phase shift network to connect the pilot signal generation module to the phase shift network; a Zadoff-Chu sequence generation step of generating a Zadoff-Chu sequence by the following (Equation 1) based on a predetermined signal generation parameter after the pilot signal generation module is connected to the phase shift network by the switch control step; and a transmission pilot signal generation step of generating the same number of transmission pilot signals as the number of transmission antennas by the following (Equation 2) based on the Zadoff-Chu sequence generated in the Zadoff-Chu sequence generation step.

$$z_q(k) = e^{-j\pi q \frac{k(k+1)}{N_{ZC}}}, k = 0, 1, 2, \ldots, N_{ZC} - 1 \quad \text{(Equation 1)}$$

($z_c(k)$: Zadoff-Chu sequence generated based on signal generation parameters, k: sample order of the sequence, $N_{ZC}$: length of the generated sequence (signal), q: a variable that determines the characteristics of the sequence using a prime number smaller than $N_{ZC}$)

$$p_n(k) = z_q(\{k - n\lfloor N_{zc}/N_{tx}\rfloor\} \bmod N_{zc}), \quad \text{(Equation 2)}$$
$$k = 0, 1, \ldots N_{zc} - 1, n = 0, 1, \ldots N_{tx} - 1$$

($p_n(k)$: transmission pilot signal of the n-th transmission antenna generated based on the Zadoff-Chu sequence, $\lfloor \ \rfloor$: rounding down operation, $N_{tx}$: total number of transmission antennas connected to the phase shift network)

Moreover, the frame and pilot signal reception step includes: a beamforming information acquisition step of acquiring beamforming information by estimating a start part of a frame from a transmitter through frame synchronization; and a transmission pilot signal reception step of receiving transmission pilot signals in the pilot signal transmission step using the beamforming information acquired in the beamforming information acquisition step.

Furthermore, the channel estimation step includes: a reception pilot signal generation step of generating reception pilot signals using a signal generation parameter for generating a Zadoff-Chu sequence included in beamforming information obtained from the frame of the transmitter; and a calculation step of generating the reception pilot signals and then performing an operation of estimating a channel by the following (Equation 5) using the transmission pilot signals from the transmitter and the generated reception pilot signals, $$\sum_{n=0}^{N-1} \frac{1}{\rho} y(n) p^H(n) = \hat{h}_0^T \quad \text{(Equation 5)}$$

($\hat{h}_0^T$: estimated channel, ρ: constant for normalization, $p^H(n)$: a value obtained by performing a Hermitian operation on $$p(n), y(n) = \sum_{l=0}^{L-1} h_l^T p(n-l), h_l \in \mathbb{C}^{N_{tx} \times 1}, p(n) \in \mathbb{C}^{N_{tx} \times 1}:$$

a transmission pilot signal received from a single reception antenna, a pilot including samples of the transmission pilot signal of each transmission antenna vector, $h_l$: the channel vector of the l-th path among multipath channels)

Furthermore, in the optimal precoding vector detection step, detecting the optimal precoding vector from among the precoding vectors included in the pre-stored codebook using the estimated channel information is performed by the following (Equation 6), $$i_{opt} = \arg\max_{i} \hat{h}_0^T w_i \quad \text{(Equation 6)}$$

($i_{opt}$: codebook number indicating the optimal precoding vector, $\hat{h}_0^T$: estimated channel, $w_i$: precoding vector, i: codebook number)

Here, the optimal precoding vector is a precoding vector that allows the receiver to receive the transmission signal from the transmitter with the highest power.

Moreover, the predetermined beamforming information includes whether the transmitter uses beamforming, the number of transmission antennas, and a signal generation parameter for generating a Zadoff-Chu sequence.

Moreover, the codebook includes at least two precoding vectors including a phase delay value for each transmission antenna connected to the transmitter calculated by the following (Equation 3).

$$\omega_i = \begin{bmatrix} 1 \\ e^{j\theta_2(i)} \\ \vdots \\ e^{j\theta_{N_{tx}}(i)} \end{bmatrix} \quad \text{(Equation 3)}$$

($w_i$: precoding vector, i: codebook number)

Advantageous Effects

The present invention is advantageous in cost optimization for system improvement because communication devices configured in the existing communication system may be used as it is, and may be implemented only by connecting devices for beamforming and changing software for communication protocol operation.

In addition, according to the present invention, as the transmitter performs beamforming through more antennas, the power efficiency of the communication system is improved.

In addition, the codebook used for beamforming in the present invention enables beamforming with improved accuracy as it includes more precoding vectors, thereby improving power efficiency of a communication system.

MODE FOR CARRYING OUT THE INVENTION

Figure 1:
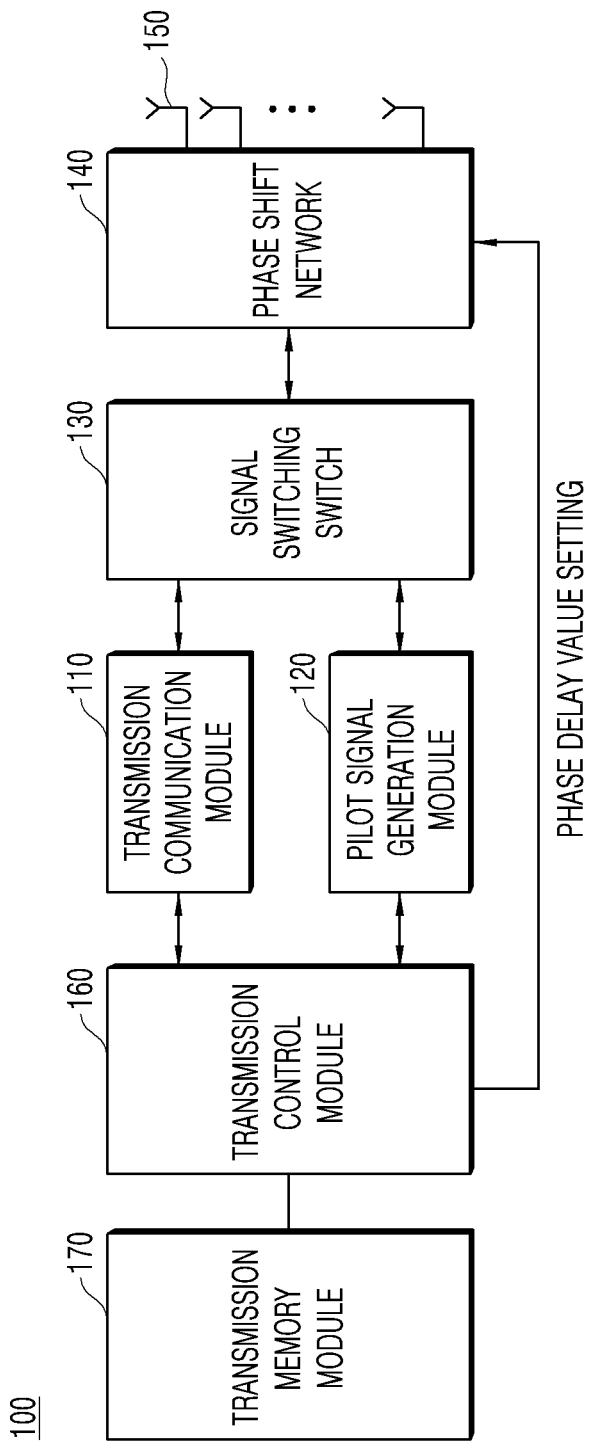
FIG. 1 is a view showing the overall configuration of a transmitter according to the present invention.

Hereinafter, embodiments of the present invention will be described in detail with reference to the accompanying drawings so that those of ordinary skill in the art may easily implement the present invention. However, the present invention may be implemented in various forms and is not limited to the embodiments described herein. In the drawings, parts irrelevant to the description are omitted in order to clearly describe the present invention, and like reference numerals refer to like elements throughout the specification.

Terms including ordinal numbers, such as first and second, may be used to describe various elements, but the elements are not limited by the terms. The above terms are used only to distinguish one component from another. For example, a first component may be referred to as a second component and vice versa without departing from the scope of the inventive concept.

The terms used in the present application are used only to describe specific embodiments, and are not intended to limit the present invention. The terms of a singular form may include plural forms unless otherwise specified.

Hereinafter, the present invention will be described in detail with reference to the drawings.

1. Channel Estimation Apparatus for Performing Beamforming According to Present Invention A channel estimation apparatus according to the present invention is an apparatus for applying beamforming in a communication system using a standard based on a single reception antenna in which beamforming is not considered, and includes a transmitter and a receiver.

Figure 2:
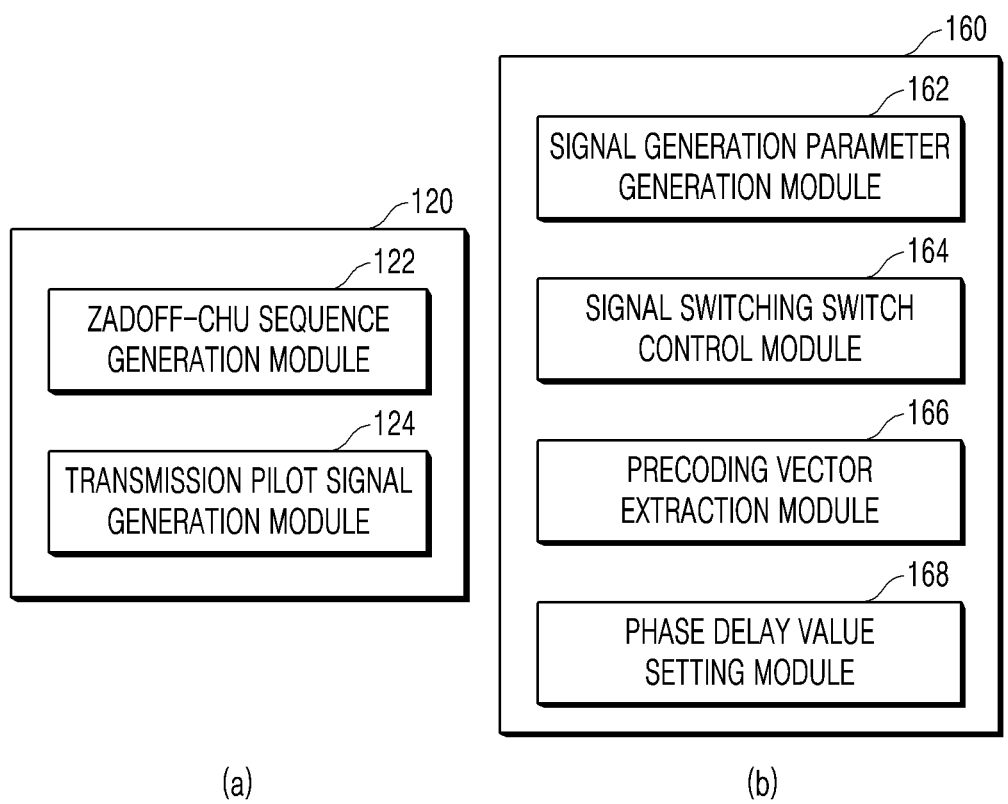
FIG. 2 is a diagram illustrating a detailed configuration of each configuration of the pilot signal generation module (120) and transmission control module (160).

FIG. 1 is a view showing the overall configuration of the transmitter according to the present invention, and FIG. 2 is a view showing the detailed configuration of each configuration of the pilot signal generation module (120) and transmission control module (160). With reference to these drawings, the transmitter according to the present invention will be described.

1.1. Transmitter 100

The transmitter 100 of the present invention is provided with at least two or more transmission antennas, and is configured to generate a predetermined number of transmission pilot signals equal to the number of the provided transmission antennas and transmits them to the receiver, receive the phase shift information corresponding to the pilot signals as feedback from the receiver, and adjust the phase for each transmission antenna by using the feedback phase shift information.

Here, the phase shift information means a codebook number corresponding to an optimal precoding vector.

This transmitter 100 may be configured to include the following configuration.

1.1.1. Transmission Communication Module 110

The transmission communication module 110 generates a frame including predetermined beamforming information, and transmits the generated frame to the receiver 200. More specifically, it is configured to generate a frame including predetermined beamforming information. In this case, predetermined beamforming information is included in the beginning of the frame.

Here, the predetermined beamforming information may include whether the transmitter uses beamforming, the number of antennas used for beamforming (i.e., the number of transmission antennas), and a parameter for generating a Zadoff-Chu sequence (hereinafter, a signal generation parameter).

The operation of generating a frame including such beamforming information→transmitting the generated frame to the receiver 100 may be performed when a transmission communication module connection signal for connecting the transmission communication module 110 to the phase shift network 140 is output from the transmission control module 160 to be described later.

This transmission communication module 110 transmits the generated beamforming information to the phase shift network 140 to be described later including the information, and enables transmission to the receiver 200 through the multiple transmission antenna 150 connected to the phase shift network 140.

Meanwhile, the frame is a unit of information transmitted as one block or packet in a data communication network, and refers to a normal data frame.

1.1.2. Pilot Signal Generation Module 120

The pilot signal generation module 120 is configured to generate a Zadoff-Chu sequence based on a predetermined signal generation parameter from the transmission control module 160 to be described later, and generate the same number of transmission pilot signals as the number of transmission antennas provided in the transmitter 100 using the generated Zadoff-Chu sequence.

The pilot signal generation module 120 may be configured to include the following detailed configuration.

A. Zadoff-Chu Sequence Generation Module 122

The Zadoff-Chu sequence generation module 122 may receive a predetermined signal generation parameter from the transmission control module 160, and based on this, may generate a Zadoff-Chu sequence that is a basis for generating a transmission pilot signal to be transmitted to the receiver 200.

Generating the Zadoff-Chu sequence may be performed by the following (Equation 1).

$$z_q(k) = e^{-j\pi q \frac{k(k+1)}{N_{ZC}}}, k = 0, 1, 2, \ldots, N_{ZC} - 1 \quad \text{(Equation 1)}$$

($z_q(k)$): Zadoff-Chu sequence generated based on signal generation parameters, k: sample order of the sequence, $N_{ZC}$: length of the generated sequence (signal), q: a variable that determines the characteristics of the sequence using a prime number smaller than $N_{ZC}$)

Here, the predetermined signal parameter received from the transmission control module 160, that is, the signal generation parameter for generating the Zadoff-Chu sequence, is the length $N_{ZC}$ of the generated sequence (signal), and a variable q that determines the characteristics of the sequence.

In an embodiment of the present invention, a value obtained by adding 1 to the largest value among prime factors of xxx is used to set the value of xxx.

B. Transmission Pilot Signal Generation Module 124

The transmission pilot signal generation module 124 may generate the same number of transmission pilot signals as the number of transmission antennas connected to the phase shift network 140 by Equation 2 below based on the Zadoff-Chu sequence generated in the Zadoff-Chu sequence generation module 122.

$$p_n(k) = z_q(\{k - n\lfloor N_{zc}/N_{tx}\rfloor\} \bmod N_{zc}), \quad \text{(Equation 2)}$$
$$k = 0, 1, \ldots N_{zc} - 1, n = 0, 1, \ldots N_{tx} - 1$$

($p_n(k)$: transmission pilot signal of the n-th transmission antenna generated based on the Zadoff-Chu sequence, $\lfloor \ \rfloor$: rounding down operation, $N_{tx}$: total number of transmission antennas connected to the phase shift network)

Such an operation of the pilot signal generation module 120 may be performed when the pilot signal generation module connection signal for connecting the pilot signal generation module 120 to the phase shift network 140 is output from the transmission control module 160.

Figure 3:
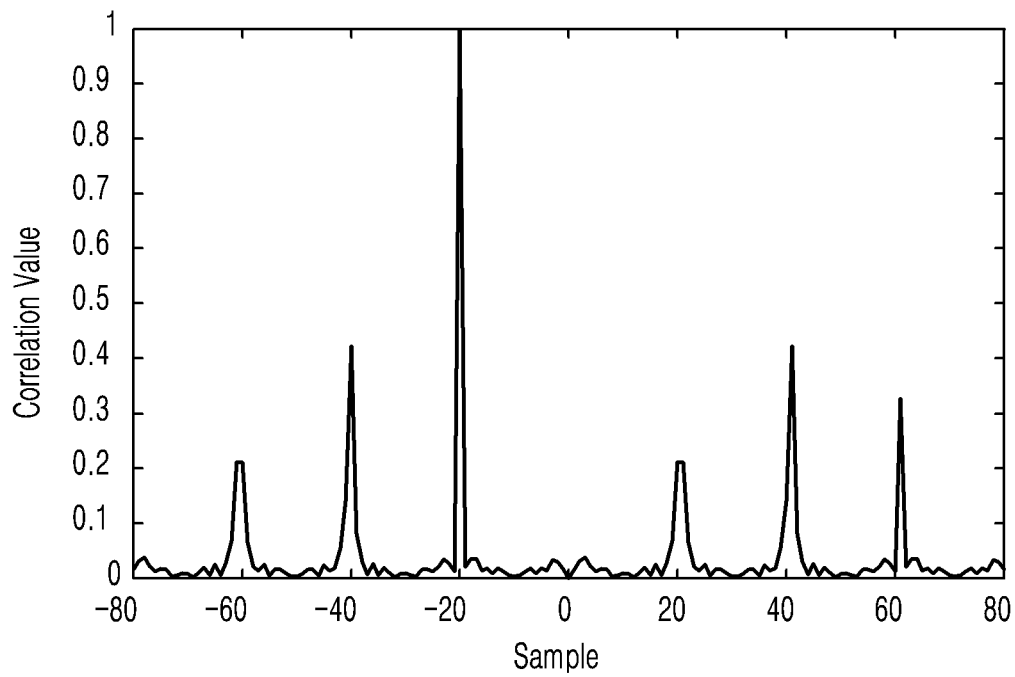
FIG. 3 is a diagram illustrating a result of a correlation operation between transmitted pilot signals generated by a transmitter of the present invention.

FIG. 3 is a diagram illustrating a result of a correlation operation between transmission pilot signals generated by a transmitter of the present invention.

In general, the Zadoff-Chu sequence may generate a signal with a constant amplitude, and has a characteristic of outputting a correlation value very close to zero when the correlation is measured by delaying one or more samples of the sequence.

FIG. 3 is an output obtained by generating 4 transmission pilot signals having a length $N_{zc}$ of a sequence of 80 samples using the channel estimation apparatus according to the present invention by utilizing the characteristics of this Zadoff-Chu sequence and performing a correlation operation between two transmission pilot signals.

Through the results shown in FIG. 3, it may be confirmed that the highest value is output when the signal length $N_{zc}$ is delayed by a value obtained by dividing the number of antennas.

1.1.3. Signal Switching Switch 130

As shown in FIG. 2, the signal switching switch 130 is configured between the transmission communication module 110 and the pilot signal generation module 120 and the phase shift network 140 to switch the connection between the transmission communication module 110 and the pilot signal generation module 120 for the phase shift network according to the control of the transmission control module 160.

More specifically, for example, one end is connected to the phase shift network 140, and the other end is located between the transmission communication module 110 and the pilot signal generation module 120, so that the other end may be implemented in a way that is connected to any one of the transmission communication module 110 and the pilot signal generation module 120 according to the control of the transmission control module 160.

That is, the signal switching switch 130 connects the transmission communication module 110 or the pilot signal generation module 120 to the phase shift network 140.

1.1.4. Phase Shift Network 140

The phase shift network 140 is configured to transmit an output signal from the transmission communication module 110 or the pilot signal generation module 120 connected through the signal switching switch 130 to the multiple transmission antenna 150 connected thereto.

The phase shift network 140 is configured to include phase shifters (not shown) corresponding to each of the connected transmission antennas 150.

The phase shifter is provided corresponding to each transmission antenna 150 in the phase shift network 140, and is configured to convert the phase of a signal connected to the corresponding transmission antenna 150 according to the phase delay value for each transmission antenna 150 set by the transmission control module 160.

That is, the phase shifters generate a phase delay of a signal of the same phase from the transmission communication module 110 or the pilot signal generation module 120 according to each phase delay value set by the transmission control module 160.

Here, when the communication protocol between the transmitter 100 and the receiver 200 is started, all phase shifters (not shown) are set as a predetermined initial phase delay value under the control of the transmission control module 160.

1.1.5. Transmission Antenna 150

The transmitter 100 of the present invention includes a plurality of transmission antennas 150. The multiple transmission antenna 150 is connected to the phase shift network 140 as shown in FIG. 1 to radiate the output signal transmitted from the phase shift network 140 toward the receiver 200 or receive a signal radiated from a single reception antenna 260 of the receiver 200.

Unlike the conventional transmitter using the existing single antenna-based communication standard, the transmitter of the present invention that enables beamforming in a single antenna-based communication standard system constitutes a plurality of transmission antennas 150.

1.1.6. Transmission Control Module 160

The transmission control module 160 is configured to obtain phase shift information corresponding to the transmission pilot signals generated by the pilot signal generation module 130 from the receiver 200 through the control of the transmission communication module 110, the pilot signal generation module 120 and the signal switching switch 130, and adjust the phase delay of each signal of the phase shift network 140 by using the obtained phase shift information.

The transmission control module 160 may be configured to include the following detailed configuration.

A. Signal Generation Parameter Generation Module 162

The signal generation parameter generation module 162 may generate a predetermined signal generation parameter for generating the Zadoff-Chu sequence and transmit the generated predetermined signal generation parameter to the Zadoff-Chu sequence generation module 122 of the pilot signal generation module 120.

Here, the predetermined signal generation parameter for generating the Zadoff-Chu sequence includes the length xxx of the generated sequence, and a variable xxx determining the characteristics of the sequence.

B. Signal Switching Switch Control Module 164

The signal switching switch control module 164 outputs a signal for switching the connection between the transmission communication module 110 and the pilot signal generation module 120 for the phase shift network 140 to the signal switching switch 130, and controls the switching operation of the switch 130.

More specifically, in order for transmission of a transmission pilot signal to the receiver 200 when the communication protocol is started, for example, by outputting a pilot signal generation module connection signal to the signal switching switch 130, the pilot signal generation module 120 may be connected to the phase shift network 140.

Then, when the transmission of the transmission pilot signals from the pilot signal generation module 120 to the receiver 200 is completed, in order for frame transmission including beamforming information to the receiver 200, for example, by outputting a transmission communication module connection signal to the signal switching switch 130, the transmission communication module 110 may be connected to the phase shift network 140.

C. Precoding Vector Extraction Module 166

The precoding vector extraction module 166 receives phase shift information corresponding thereto from the receiver 200 that has received the transmission pilot signals and beamforming information by the pilot signal generation module 120 and the transmission communication module 110 and extracts the corresponding precoding vector from the pre-stored codebook using the phase shift information.

Here, the phase shift information means a codebook number corresponding to the optimal precoding vector detected by the receiver 200.

D. Phase Delay Value Setting Module 168

The phase delay value setting module 168 sets a phase delay value of each of the phase shifters (not shown) configured in the phase shift network 140 described above as a phase delay value corresponding to each transmission antenna 150 included in the precoding vector extracted by the precoding vector extraction module 166.

Here, the phase delay value setting module 168 may set the phase delay values of all phase shifters (not shown) of the phase shift network 140 as a predetermined initial phase delay value in the initial state when the communication protocol is started between the transmitter 100 and the receiver 200.

That is, when the communication protocol is started, after all phase shifters (not shown) of the phase shift network 140 are set as a predetermined initial phase delay value, thereafter, using the phase shift information fed back from the receiver 200 through frame generation including transmission pilot signals and beamforming information, the phase delay value of each phase shifter (not shown) is set differently.

Here, setting the phase delay values of the phase shifters means setting how to perform the phase shift in each transmission antenna.

After the signal phase delay value of the phase shift network is set according to the feedback for the codebook number from the receiver 200 in this way, thereafter, the communication between the transmitter 100 and the receiver 200 may be performed using the communication modules 110 and 210.

1.1.7. Transmission Memory Module 170

The transmission memory module 170 is a configuration in which a codebook including a plurality of precoding vector information is stored in advance.

The codebook of the present invention includes phase delay value information of phase shifters (not shown) of the phase shift network 140, and more specifically, includes a phase delay value for each transmission antenna 150 connected to the phase shift network 140 and information on a plurality of precoding vectors to which the corresponding codebook number is assigned.

The precoding vector is calculated by the following (Equation 3).

$$\omega_i = \begin{bmatrix} 1 \\ e^{j\theta_2(i)} \\ \vdots \\ e^{j\theta_{N_{tx}}(i)} \end{bmatrix} \quad \text{(Equation 3)}$$

($w_i$: precoding vector, i: codebook number)

Here, each element constituting the above precoding vector represents a phase delay value for each antenna for delaying a signal.

Here, the phase delay values, which are elements constituting the precoding vector, may be values designed based on an actual physical angle through a predetermined experiment.

Figure 4:
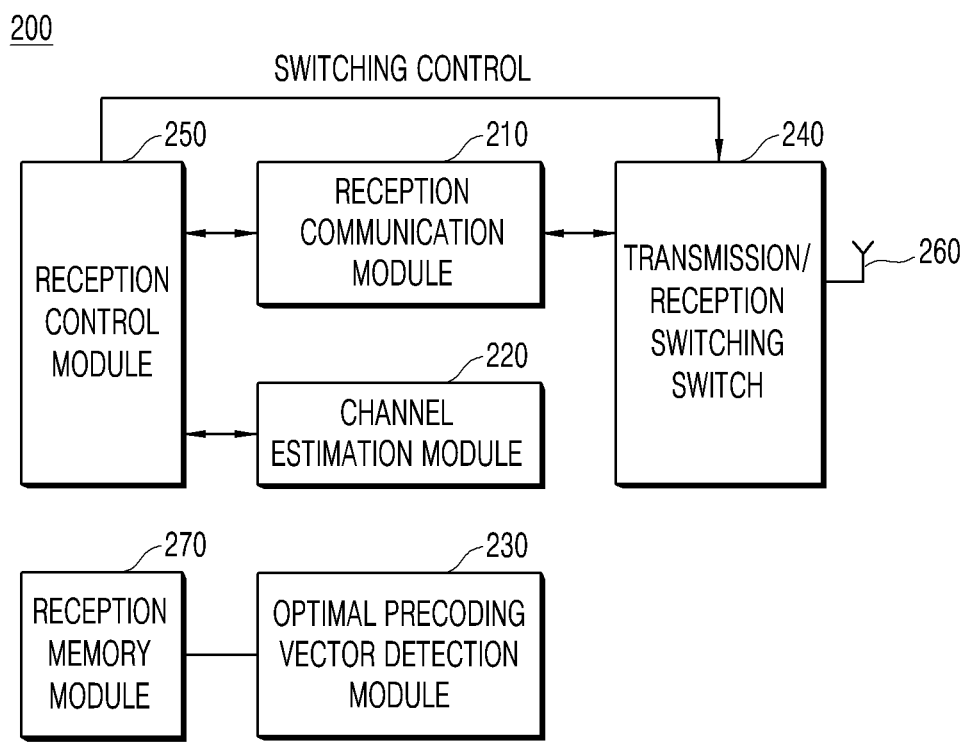
FIG. 4 is a diagram showing the overall configuration of a receiver according to the present invention.

FIG. 4 is a diagram showing the overall configuration of a receiver according to the present invention. The receiver of the present invention will be described with reference to FIG. 4.

1.2. Receiver 200

The receiver 200 according to the present invention is provided with a single reception antenna 170 as shown in FIG. 4, and is configured to estimate a channel for beamforming based on the transmission pilot signals transmitted from the transmitter 100, derive an optimal precoding vector to be applied by the transmitter 100 based on the estimated channel information and a pre-stored codebook, and feed back the corresponding phase shift information to the transmitter 100.

Here, the optimal precoding vector means a precoding vector that allows the receiver 200 to receive the transmission signal from the transmitter 100 with the highest power.

The receiver 200 may be configured to include the following configuration.

1.2.1. Reception Communication Module 210

The reception communication module 210 may obtain beamforming information included in a frame generated and transmitted by the transmitter 100 described above through frame synchronization, and may receive transmission pilot signals using the obtained beamforming information.

Performing frame synchronization may perform sampling on an interval longer than the sum of the maximum length of the frame length and the maximum length of the transmission pilot signal using a conventional synchronization technique, and perform synchronization.

In this way, the synchronization of the frame transmitted from the transmission communication module 110 of the transmitter 100 in the reception communication module 210 may be described as finding beamforming information included in the beginning of the frame.

Figure 6:
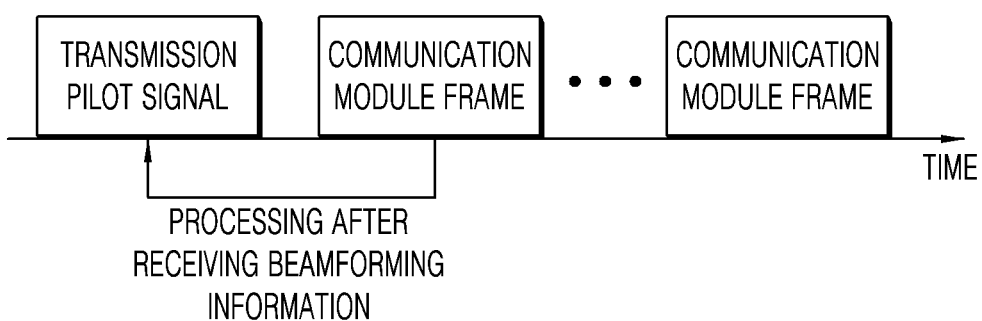
FIG. 6 is a diagram illustrating the division and sequence of signals transmitted over time in the communication system of the present invention.

FIG. 6 is a diagram illustrating the division and sequence of signals transmitted over time in the communication system of the present invention. As shown in FIG. 6, before communication using a communication module between the transmitter 100 and the receiver 200 proceeds, pilot signals for beamforming are transmitted.

After transmission of the pilot signal, the transmitter transmits information for beamforming to the receiver through the first frame of the communication module, and the receiver performs channel estimation and estimation of an optimal precoding vector based on beamforming information included in the first frame.

Beamforming information obtained through synchronization may include, as described above, whether the transmitter uses beamforming, the number of antennas used for beamforming (transmission antenna number), and a signal generation parameter for generating a Zadoff-Chu sequence.

On the other hand, receiving the transmission pilot signals from the transmitter 100 using this beamforming information may identify the number and length of transmission pilot signals, and collect/receive transmission pilot signals through the signal generation parameter for generating the Zadoff-Chu sequence included in the beamforming information.

Here, information on the collected/received transmission pilot signals may be separately stored in the reception memory module 270.

On the other hand, the reception communication module 210 is configured to include a receiving circuit (not shown) and a transmitting circuit (not shown), so that it may transmit or receive a signal to or from a single reception antenna 260 through a transmission/reception switching switch 240 to be described later.

More specifically, the transmission/reception switching switch 240 may receive a frame and transmission pilot signals from the transmitter 100 in a state in which the transmission/reception switching switch 240 is connected to a receiving circuit (not shown), and transmit the optimal precoding vector detected by the phonological precoding vector detection module 230 to be described later to the single reception antenna 260 to the transmitter 100 in a state in which the transmission/reception switching switch 240 is connected to the transmission circuit (not shown).

1.2.2. Channel Estimation Module 220

When the beamforming use of the transmitter is confirmed using the beamforming information from the transmitter 100 obtained by the reception communication module 210, the channel estimation module 220 may generate reception pilot signals based on the received transmission pilot signals and estimate a channel using the transmission pilot signals and the reception pilot signals.

Here, as described above, since the beamforming information from the transmitter 100 includes whether the transmitter uses beamforming or not, it is possible to check the beamforming use of the transmitter from this.

Figure 5:
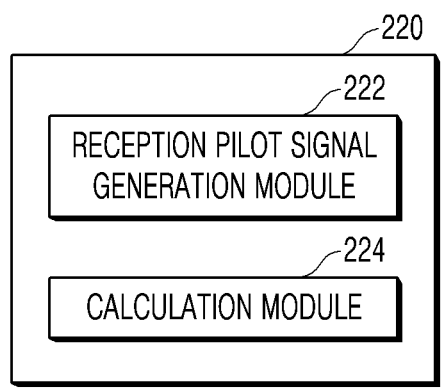
FIG. 5 is a diagram illustrating a detailed configuration of a channel estimation module.

The channel estimation module 220 may be configured to include the following detailed configuration as shown in FIG. 5.

A. Reception Pilot Signal Generation Module 222

The reception pilot signal generation module 222 generates reception pilot signals by using the beamforming information from the transmitter 100 obtained by the reception communication module 210.

More specifically, reception pilot signals may be generated using a signal generation parameter for generating a Zadoff-Chu sequence included in the obtained beamforming information.

B. Calculation Module 224

The calculation module 224 may perform a channel estimation operation by the following (Equation 5) using the transmission pilot signals from the transmitter 100 received by the reception communication module 210 and the reception pilot signals generated by the reception pilot signal generation module 222.

First, the received transmission pilot signal from the transmitter 100 is expressed by an equation as shown in Equation 4 below.

$$y(n) = \sum_{l=0}^{L-1} h_l^T p(n-l), \; h_l \in \mathbb{C}^{N_{tx} \times 1}, \; p(n) \in \mathbb{C}^{N_{tx} \times 1} \quad \text{(Equation 4)}$$

(p(n): pilot vector including samples of the transmission pilot signal of each transmission antenna, $h_l$: channel vector of the l-th path among multipath channels)

An operation for channel estimation may be performed using (Equation 4) expressed as above. The operation for channel estimation is performed as a sum operation on all samples after multiplying y(n) and $p^H(n)$ in (Equation 4) as shown in Equation 5 below.

$$\sum_{n=0}^{N-1} \frac{1}{\rho} y(n) p^H(n) = \widehat{h_0^T} \quad \text{(Equation 5)}$$

($\widehat{h_0^T}$: estimated channel, $\rho$: constant for normalization, $p^H(n)$: value obtained by performing Hermitian operation on p(n))

Here, the estimated channel $\widehat{h_0^T}$ means a vector including amplitude/phase distortion information for each transmission antenna.

Considering the characteristics of the Zadoff-Chu sequence, $\widehat{h_0^T}$ may be approximated as a vector corresponding to the first channel among multipath channels.

In general, in a multipath channel, since the path that receives the highest power is most likely to be the one that arrives first, beamforming using $\widehat{h_0^T}$ is more efficient than performing beamforming toward another path. Therefore, $\widehat{h_0^T}$ representing the estimated channel may be approximated by a vector corresponding to the first channel among the multipath channels.

1.2.3. Optimal Precoding Vector Detection Module 230

The optimal precoding vector detection module 230 detects an optimal precoding vector to be applied by the transmitter 100 among precoding vectors included in a pre-stored codebook using the channel information estimated by the channel estimation module 220.

Detecting an optimal precoding vector from among the precoding vectors included in the codebook using the estimated channel information is performed by the following (Equation 6).

$$i_{opt} = \mathrm{argmax}_i \widehat{h_0^T} w_i \quad \text{(Equation 6)}$$

($i_{opt}$: codebook number indicating the optimal precoding vector, $\widehat{h_0^T}$ estimated channel, $w_i$: precoding vector, i: codebook number)

Here, the optimal precoding vector means a precoding vector capable of receiving the transmission signal from the transmitter 100 in the receiver 200 with the highest power as described above.

When the optimal precoding vector is detected as described above, the codebook number xxx indicating this is transmitted to the reception communication module 210 so that the transmitter 100 may receive feedback.

1.2.4. Transmission/Reception Switching Switch 240

The transmission/reception switching switch 240 is configured between the reception communication module 210 and the single reception antenna 260 to switch the transmission/reception state of the reception communication module 210 for the single reception antenna 260.

More specifically, one end is connected to the single reception antenna 260, and the other end is configured in a form located between the reception circuit (not shown) and the transmission circuit (not shown) of the reception communication module 210, so that a reception circuit (not shown) and a single reception antenna 260 may be connected or a transmission circuit (not shown) and a single reception antenna 260 may be connected under the control of the reception control module 250 to be described later.

For example, when a reception signal is output from the reception control module 250, the other end may be connected to a reception circuit (not shown) to connect a single reception antenna 260 and a reception circuit (not shown) of the reception communication module 210. In addition, when the transmission signal is output from the reception control module 250, it may be implemented in the form of connecting a single reception antenna 260 and a transmission circuit (not shown) by switching the other end to a transmission circuit (not shown).

1.2.5. Reception Control Module 250

The reception control module 250 may control a switching operation of the transmission/reception switching switch 240 to switch a transmission/reception state of the reception communication module 210.

First, in order for the reception communication module 210 to receive beamforming information and transmission pilot signals from the transmitter 100, for example, by outputting a reception signal to the transmission/reception switching switch 240, the other end of the transmission/reception switching switch 240 may be located in a reception circuit (not shown) of the reception communication module 210.

Thereafter, in order for the reception communication module 210 to transmit the codebook number of the optimal precoding vector detected by the optimal precoding vector detection module 230 to the transmitter 100, for example, by outputting the transmission signal to the transmission/reception switching switch 240, the other end of the transmission/reception switching switch 240 may be located in a transmission circuit (not shown) of the reception communication module 210.

Meanwhile, although the drawing shows the channel estimation module 220 and the optimal precoding vector module 230 as separate hardware components, the present invention is not limited thereto and may be implemented in software in the reception control module 250.

1.2.6. Reception Antenna 260

The receiver 200 is provided with a single reception antenna 260, and as shown in FIG. 4, is connected to the transmission/reception switching switch 240 to radiate an output signal transmitted from the reception communication module 210 through the transmission/reception switching switch 240 toward the transmitter 100 or receive a signal radiated from the multiple transmission antenna 150 of the transmitter 100.

1.2.7. Reception Memory Module 270

The reception memory module 270 stores in advance the same codebook as the codebook including a plurality of precoding vector information stored in the transmission memory module 170 of the transmitter 100.

In addition, information on transmission pilot signals of the transmitter 100 received by the reception communication module 210 may be additionally stored.

Figure 7:
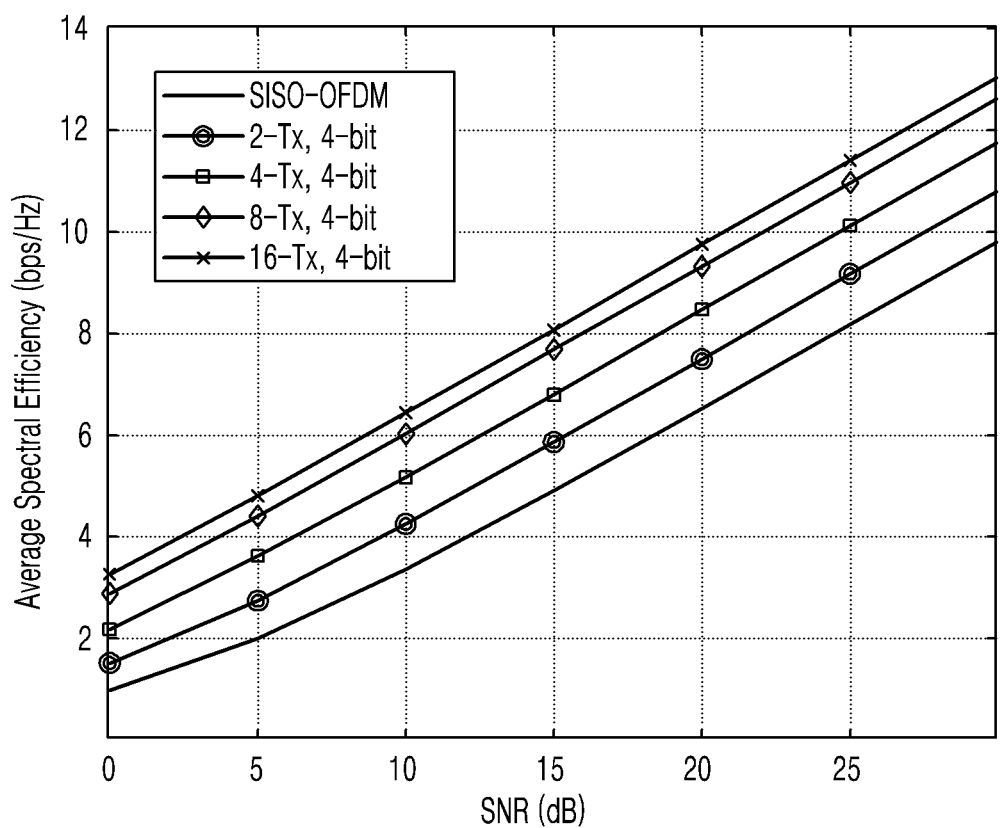
FIG. 7 is a diagram illustrating a maximum frequency efficiency achievable by using a channel estimation apparatus for beamforming according to the present invention measured according to a signal-to-noise ratio (SNR).

FIG. 7 is a diagram illustrating the maximum frequency efficiency achievable by using a channel estimation apparatus for beamforming according to the present invention measured according to a signal to noise ratio (SNR).

In the legend in FIG. 7, the number of transmission antennas and the size of the codebook for beamforming may be confirmed. The vertical axis of FIG. 7 represents the limiting data rate theoretically achievable without error at a single frequency, and the horizontal axis represents the signal-to-noise ratio (SNR) of the reception signal.

From the results shown in FIG. 7, it may be confirmed that the frequency efficiency is improved as the codebook is designed by using more antennas and allocating more bits.

Figure 8:
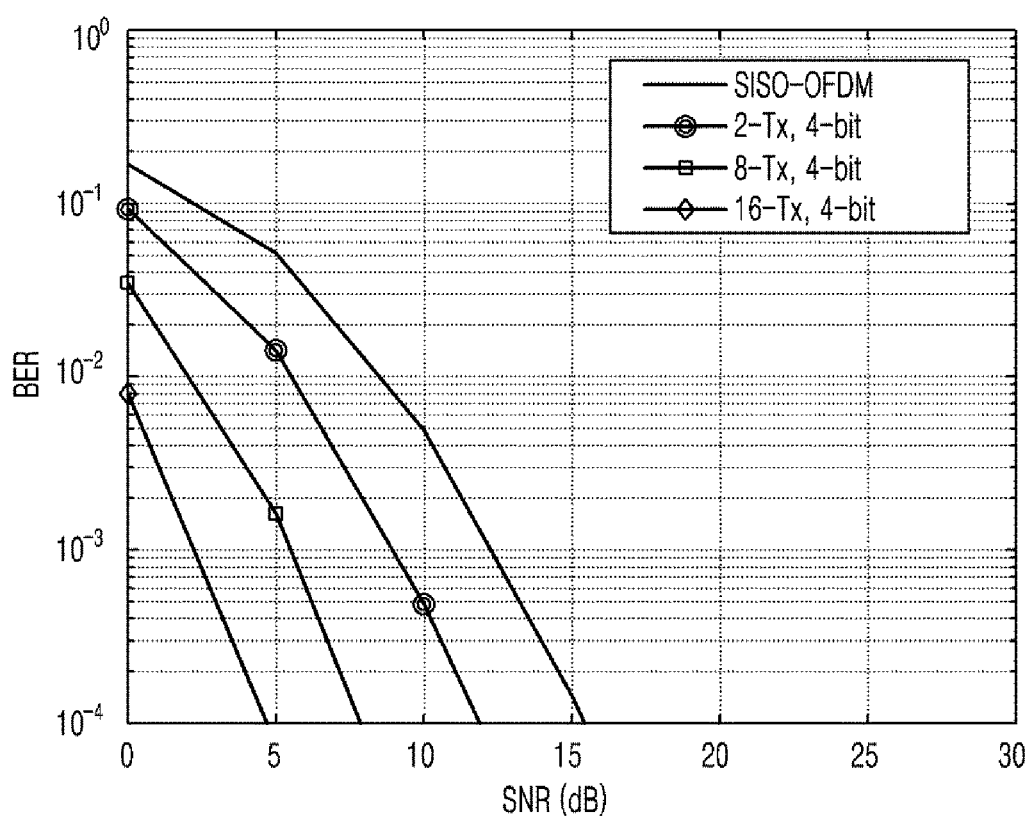
FIG. 8 is a diagram illustrating bit error performance achievable by using a channel estimation apparatus for beamforming according to the present invention measured according to a signal-to-noise ratio (SNR).

FIG. 8 is a diagram illustrating bit error performance achievable by using a channel estimation apparatus for beamforming according to the present invention measured according to a signal-to-noise ratio (SNR).

The vertical axis of FIG. 8 represents the bit error ratio, and the horizontal axis represents the signal-to-noise ratio (SNR) of the reception signal.

As in FIG. 7, the result of FIG. 8 also confirms that fewer bit errors occur as the number of transmission antennas and the number of bits allocated for codebook design increases.

Figure 9:
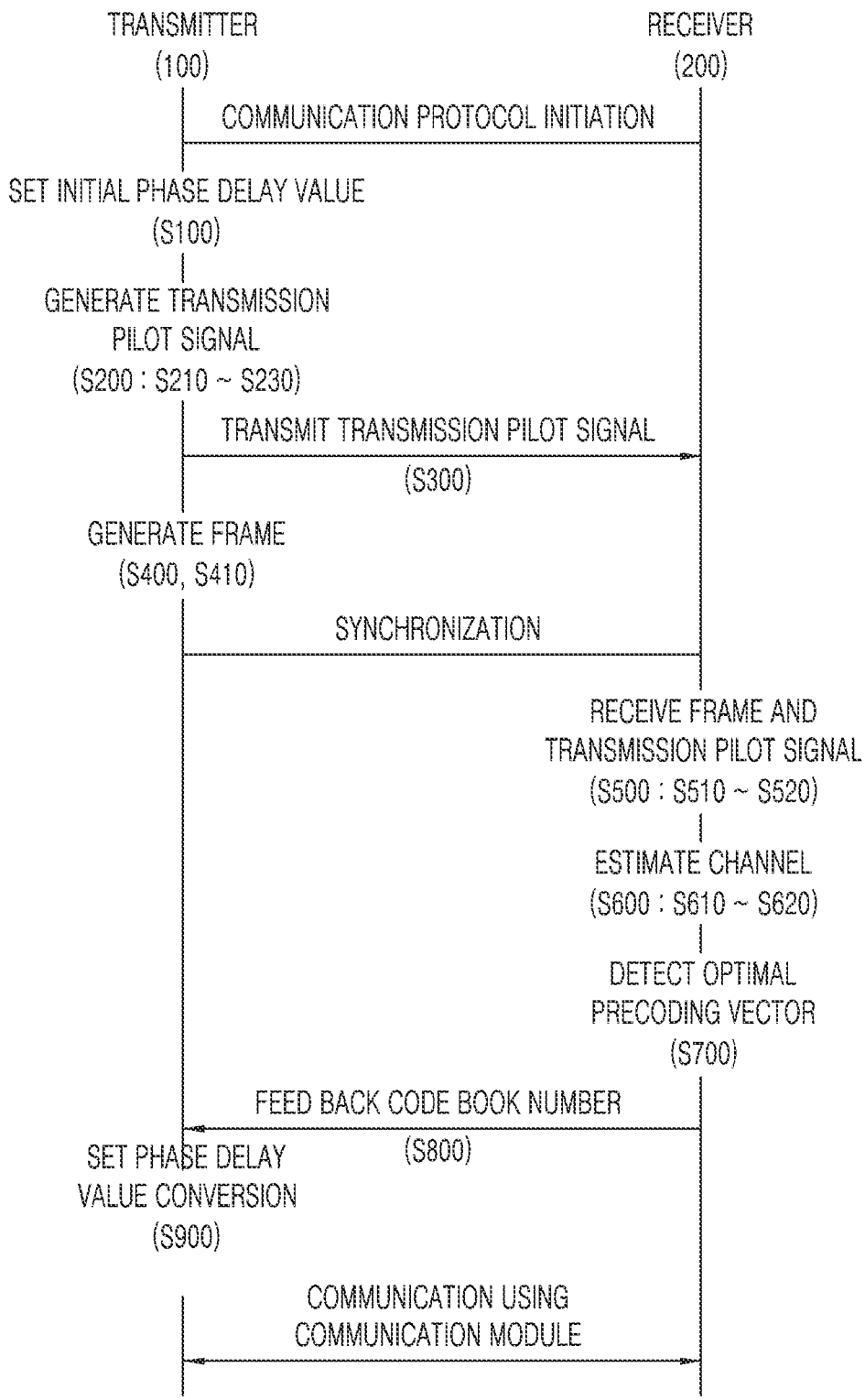
FIG. 9 is a diagram illustrating an overall flowchart of a channel estimation method for beamforming according to the present invention.

2. Channel Estimation Method for Performing Beamforming According to Present Invention FIG. 9 is a flowchart illustrating a channel estimation method for beamforming according to the present invention. Referring to FIG. 9, it may be configured to include the following steps.

2.1. Initial Phase Delay Value Setting Step S100

First, when a communication protocol is started between the transmitter 100 and the receiver 200, in the transmitter 100, a phase delay value of all phase shifters (not shown) configured in the phase shift network 140 is set as a predetermined initial phase delay value.

Here, the phase shifters (not shown) are configured to correspond to each transmission antenna 150 connected to the phase shift network 140.

2.2. Pilot Signal Generation Step S200

In the transmitter 100 provided with multiple transmission antenna 150, this is a step of generating a Zadoff-Chu sequence based on a predetermined signal generation parameter, and generating a predetermined number of transmission pilot signals equal to the number of the multiple transmission antennas 150 by using the generated Zadoff-Chu sequence.

2.2.1. Switch Control Step S210

First, a step of controlling the signal switching switch 130 configured between the transmission communication module 110 and the pilot signal generation module 120 and the phase shift network 140, and connecting the pilot signal generation module 120 to the phase shift network 140 is performed. This operation is performed by the transmission control module 160 of the transmitter 100.

2.2.2. Zadoff-Chu Sequence Generation Step S220

When the pilot signal generation module 120 is connected to the phase shift network 140 through the switch control step S210, a Zadoff-Chu sequence generation step S120 for generating a Zadoff-Chu sequence by the following (Equation 1) is performed based on a predetermined signal generation parameter.

$$z_q(k) = e^{-j\pi q \frac{k(k+1)}{N_{ZC}}}, k = 0, 1, 2, \ldots, N_{ZC} - 1 \quad \text{(Equation 1)}$$

($z_q$(k): Zadoff-Chu sequence generated based on the signal generation parameter, k: sample order of the sequence, $N_{ZC}$: length of the generated sequence, q: a variable that determines the characteristics of the sequence using a prime number smaller than $N_{ZC}$)

Here, the predetermined signal parameter, that is, the signal generation parameter for generating the Zadoff-Chu sequence, includes a length $N_{ZC}$ of the sequence generated in Equation 1 above, and a variable q that determines the characteristics of the sequence. This signal generation parameter may be provided from the transmission control module 160 of the transmitter 100.

In an embodiment of the present invention, a value obtained by adding 1 to the largest value among prime factors of $N_{ZC}$ is used to set the value of Q.

2.2.3. Transmission Pilot Signal Generation Step S230

When the Zadoff-Chu sequence is generated in the Zadoff-Chu sequence generation step S220, the transmission pilot signal generation step S230 is a step of generating the same number of transmission pilot signals as the number of multiple transmission antennas 150 provided in the transmitter 100 by (Equation 2) below based on the generated Zadoff-Chu sequence.

$$p_n(k) = z_q(\{k - n\lfloor N_{zc} / N_{tx} \rfloor\} \bmod N_{zc}), \quad \text{(Equation 2)}$$
$$k = 0, 1, \ldots N_{zc} - 1, n = 0, 1, \ldots N_{tx} - 1$$

($p_n$(k): transmission pilot signal of the n-th transmission antenna generated based on the Zadoff-Chu sequence, $\lfloor \ \rfloor$: rounding down operation, $N_{tx}$: total number of transmission antennas connected to the phase shift network)

Here, the predetermined signal generation parameter refers to a parameter for generating a Zadoff-Chu sequence.

2.3. Pilot Signal Transmission Step S300

The transmitter 100 transmits the transmission pilot signals generated in the pilot signal generation step S100 to the receiver 200.

More specifically, the pilot signal generation module 120 of the transmitter 100 transmits the transmission pilot signals generated by the multi-antenna number 150 to each transmission antenna 150 through the phase shift network 140, and each transmission antenna 150 may be configured to transmit the transmission pilot signals to the receiver 200 by radiating the received signal.

2.4. Frame Generation Step S400

In the transmitter 100, a frame generation step S400 of generating a frame including predetermined beamforming information and transmitting the generated frame to the multiple transmission antenna 150 through the phase shift network 140 is performed.

Here, the frame generation step S400 may be configured to include a switch control step S410 of switching the state of the signal switching switch 130 connecting the phase shift network 140 and the pilot signal generation module 120 to a state in which the transmission communication module 110 is connected to the phase shift network 140 through the pilot signal generation step S200.

That is, by controlling the switching operation of the signal switching switch 130 to generate a frame including predetermined beamforming information in a state in which the transmission communication module 110 is connected to the phase shift network 140, the generated frame is transmitted to the multiple transmission antenna 150 through the phase shift network 140.

At this time, the beamforming information is included in the beginning of the frame and configured to be transmitted to the receiver 200 through the multiple transmission antenna 150.

In addition, the predetermined beamforming information may include whether the transmitter uses beamforming, the number of transmission antennas, and a signal generation parameter for generating a Zadoff-Chu sequence.

2.5. Frame and Pilot Signal Reception Step S500

The frame and pilot signal reception step S500 is a step of obtaining beamforming information included in the frame generated by the transmitter 100 in the frame generation step S400 through frame synchronization and receiving the transmission pilot signals using the obtained beamforming information in the receiver 200 provided with a single reception antenna 260.

Here, the reception control module 250 of the receiver 200 is provided in a state in which a reception state is made by connecting a reception circuit (not shown) of the reception communication module 210 to a single reception antenna 260 through the control of the transmission/reception switching switch 240 configured between the reception communication module 210 and the single reception antenna 260.

Such a frame and pilot signal reception step S500 may be configured including the following detailed steps.

2.5.1. Beamforming Information Acquisition Step S510

The receiver 200 may acquire beamforming information included in the frame by performing frame synchronization to estimate the start part of the frame from the transmitter 100.

Such an operation is performed by the reception communication module 210 of the receiver 200 described above.

2.5.2. Transmission Pilot Signal Reception Step S520

In the receiver 200, after acquiring beamforming information in the beamforming information acquisition step S510, the transmission pilot signals transmitted in the pilot signal transmission step S300 are received using the acquired beamforming information.

The reception of the transmission pilot signals may recognize and receive the number and length of the transmission pilot signals through the signal generation parameter for generating the Zadoff-Chu sequence included in the beamforming information acquired in the beamforming information acquisition step S510.

2.6. Channel Estimation Step S600

When the beamforming use of the transmitter 100 is confirmed using the beamforming information obtained in the frame and pilot signal reception step S500, the receiver 200 generates reception pilot signals based on the received transmission pilot signals and estimates a channel using the transmission and reception pilot signals.

2.6.1. Reception Pilot Signal Generation Step S610

First, reception pilot signals may be generated using a signal generation parameter for generating a Zadoff-Chu sequence included in beamforming information obtained from a frame of the transmitter 100.

2.6.2. Calculation Step S620

After generating the reception pilot signals, using the received transmission pilot signals and the generated reception pilot signals, a channel estimation operation may be performed by (Equation 5) below to estimate a channel.

The transmission pilot signal received from the transmitter 100 is expressed by the following equation (Equation 4), and using this, an operation for estimating the channel may be performed by the following (Equation 5).

$$y(n) = \sum_{l=0}^{L-1} h_l^T p(n-l), \; h_l \in \mathbb{C}^{N_{tx} \times 1}, \; p(n) \in \mathbb{C}^{N_{tx} \times 1} \qquad \text{(Equation 4)}$$

(p(n): pilot vector including samples of the transmission pilot signal of each transmission antenna, $h_l$: channel vector of the l-th path among multipath channels)

An operation for channel estimation may be performed using (Equation 4) expressed as above. The operation for channel estimation is performed as a sum operation on all samples after multiplying y(n) and $p^H(n)$ in (Equation 4) as shown in Equation 5 below.

$$\sum_{n=0}^{N-1} \frac{1}{\rho} y(n) p^H(n) = \widehat{h_0^T} \qquad \text{(Equation 5)}$$

($\widehat{h_0^T}$: estimated channel, $\rho$: constant for normalization, $p^H(n)$: value obtained by performing Hermitian operation on p(n))

Here, the estimated channel $\widehat{h_0^T}$ means a vector including amplitude/phase distortion information for each transmission antenna.

Here, considering the characteristics of the Zadoff-Chu sequence, $\widehat{h_0^T}$ may be approximated as a vector corresponding to the first channel among multipath channels.

In general, in a multipath channel, since the path that receives the highest power is most likely to be the one that arrives first, beamforming using $\widehat{h_0^T}$ is more efficient than performing beamforming toward another path. Therefore, $\widehat{h_0^T}$ representing the estimated channel may be approximated by a vector corresponding to the first channel among the multipath channels.

2.7. Optimal Precoding Vector Detection Step S700

In receiver 200, an optimal precoding vector detection step S700 of detecting an optimal precoding vector to be applied by the transmitter 100 among precoding vectors included in a pre-stored codebook using the channel information estimated in the channel estimation step S600 may be performed.

Detecting an optimal precoding vector from among the precoding vectors included in the codebook using the estimated channel information is performed by the following (Equation 6).

$$i_{opt} = \arg\max_i \widehat{h_0^T} w_i \qquad \text{(Equation 6)}$$

($i_{opt}$: codebook number indicating the optimal precoding vector, $\widehat{h_0^T}$: estimated channel, $w_i$: precoding vector, i: codebook number)

Here, as described above, the optimal precoding vector means a precoding vector capable of receiving the transmission signal from the transmitter 100 in the receiver 200 with the highest power.

On the other hand, the codebook includes a predetermined phase delay value for each transmission antenna 150 connected to the phase shift network 140 and includes a plurality of precoding vector information to which the corresponding codebook number is assigned. The precoding vector included in this codebook is calculated by the following (Equation 3).

$$\omega_i = \begin{bmatrix} 1 \\ e^{j\theta_2(i)} \\ \vdots \\ e^{j\theta_{N_{tx}}(i)} \end{bmatrix} \qquad \text{(Equation 3)}$$

($w_i$: precoding vector, i: codebook number)

Here, each element constituting the above precoding vector represents a phase delay value for each antenna for delaying a signal.

2.8. Codebook Number Feedback Step S800

The receiver 200 performs a step of feeding back the codebook number corresponding to the optimal precoding vector detected in the optimal precoding vector detection step S700 to the transmitter 100 through the single reception antenna 260.

Here, the reception control module 250 of the receiver 200 is provided in a state in which a transmission state is made by connecting a transmission circuit (not shown) of the reception communication module 210 to a single reception antenna 260 through the control of the transmission/reception switching switch 240 configured between the reception communication module 210 and the single reception antenna 260.

2.9. Phase Delay Value Conversion Setting Step S900

In the transmitter 100, the corresponding precoding vector is extracted from the pre-stored codebook using the codebook number fed back from the receiver 200 through the codebook number feedback step S800, and a signal phase for each transmission antenna 150 is converted and set to a phase delay value corresponding to each transmission antenna 150 included in the extracted precoding vector.

More specifically, a phase delay value corresponding to each transmission antenna 150 included in the extracted precoding vector may be converted into a phase delay value of each of the phase shifters (not shown) of the phase shift network 140 and may be set.

After the signal phase delay value of the phase shift network is set according to the feedback for the codebook number from the receiver 200 in this way, thereafter, the communication between the transmitter 100 and the receiver 200 may be performed using the communication modules 110 and 210.

On the other hand, when a signal of low power is received below a certain standard in the reception communication module of the receiver, in order to estimate the channel and the optimal precoding vector for resetting the phase shift network, the above-described steps S100 to S900 are repeatedly performed to adjust the phase of the phase shift network 140 again.

On the other hand, although the technical idea of the present invention has been specifically described according to the above embodiment, it should be noted that the above embodiments are for the purpose of explanation and not limitation. In addition, those skilled in the art in the technical field of the present invention will be able to understand that various embodiments are possible within the scope of the spirit of the present invention.

The invention claimed is:

1. A channel estimation apparatus for performing beamforming in a communication system using a single antenna-based standard, the channel estimation apparatus comprising:
   a transmitter comprising:
   at least two transmission antennas;
   a configuration to generate a predetermined number of transmission pilot signals equal to the number of the provided transmission antennas to transmit the generated predetermined number of transmission pilot signals to a receiver;
   a configuration to receive phase shift information corresponding to the pilot signals as feedback from the receiver to adjust a signal phase for each transmission antenna using the feed-back phase shift information; and
   a receiver comprising:
   a single reception antenna;
   a configuration to estimate a channel for beamforming based on the transmission pilot signals transmitted from the transmitter;
   a configuration to detect an optimal precoding vector to be applied to the transmitter based on the estimated channel information and a pre-stored codebook and to feed back the corresponding phase shift information to the transmitter;
   wherein the transmitter further comprises:
   a transmission communication module configured to generate a frame including predetermined beamforming information and transmit the generated frame to multiple transmission antennas through a phase shift network;
   a pilot signal generation module configured to generate a Zadoff-Chu sequence based on a predetermined signal generation parameter from a transmission control module, and generate a predetermined number of transmission pilot signals equal to the number of transmission antennas provided in the transmitter using the generated Zadoff-Chu sequence;
   a signal switching switch control module positioned between the transmission communication module, the pilot signal generation module, and the phase shift network to connect the transmission communication module or the pilot signal generation module to the phase shift network according to the control of the transmission control module;
   a phase shift network including phase shifters corresponding to the respective transmission antennas, and configured to transmit an output signal from the transmission communication module or the pilot signal generation module connected through the signal switching switch to the connected multiple transmission antennas;
   multiple transmission antennas connected to the phase shifters of the phase shift network and configured to radiate an output signal transmitted from the phase shift network to the receiver; and
   a transmission control module configured to obtain phase shift information corresponding to the transmission pilot signals generated in the pilot signal generation module through the control of the transmission communication module, the pilot signal generation module and the signal switching switch from the receiver, and adjust the phase delay of each signal of the phase shift network using the acquired phase shift information.

2. The channel estimation apparatus of claim 1, wherein the pilot signal generation module comprises:
   a Zadoff-Chu sequence generation module configured to receive a predetermined signal generation parameter from the transmission control module and generates a Zadoff-Chu sequence by the following (Equation 1) based on this; and
   a transmission pilot signal generation module configured to generate the same number of transmission pilot signals as the number of transmission antennas connected to the phase shift network by the following (Equation 2) based on the Zadoff-Chu sequence generated in the Zadoff-Chu sequence generation module,
   wherein the generated transmission pilot signals are transmitted to the phase shift network through the signal switching switch, $$z_q(k) = e^{-j\pi q \frac{k(k+1)}{N_{ZC}}}, k = 0, 1, 2, \ldots, N_{ZC} - 1 \quad \text{(Equation 1)}$$

Zadoff-Chu sequence generated based on signal generation parameters, k: sample order of the sequence, $N_{ZC}$: length of the generated sequence (signal), q: a variable that determines the characteristics of the sequence using a prime number smaller than $N_{ZC}$)

$$p_n(k) = z_q(\{k - n\lfloor N_{zc}/N_{tx} \rfloor\} \bmod N_{zc}), \quad \text{(Equation 2)}$$
$$k = 0, 1, \ldots N_{zc} - 1, n = 0, 1, \ldots N_{tx} - 1$$

($p_n(k)$: transmission pilot signal of the n-th transmission antenna generated based on the Zadoff-Chu sequence, $\lfloor \ \rfloor$: rounding down operation, $N_{tx}$: total number of transmission antennas connected to the phase shift network).

3. The channel estimation apparatus of claim 1, wherein the transmission control module comprises:
   a signal generation parameter generation module configured to generate a predetermined signal generation parameter for generating a Zadoff-Chu sequence and transmits the generated predetermined signal generation parameter to the pilot signal generation module;
   a signal switching switch control module configured to control a switching operation of the signal switching switch to connect the pilot signal generation module or the transmission communication module to the phase shift network;
   a precoding vector extraction module configured to receive the phase shift information corresponding thereto from the receiver that receives transmission pilot signals and beamforming information by the pilot signal generation module and the transmission communication module to extract a corresponding precoding vector from a pre-stored codebook using the phase shift information; and a phase delay value setting module configured to set a phase delay value of each of the phase shifters of the phase shift network as a phase delay value corresponding to each transmission antenna included in the precoding vector extracted from the precoding vector extraction module.

4. The channel estimation apparatus of claim 3, wherein the signal switching switch control module, when a communication protocol is started, output a pilot signal generation module connection signal to the signal switching switch to connect the pilot signal generation module to the phase shift network, and when transmission of the transmission pilot signals to the receiver is completed, output a transmission communication module connection signal to the signal switching switch to connect the transmission communication module to the phase shift network.

5. The channel estimation apparatus of claim 3, wherein the transmitter further comprises a transmission memory module configured to store in advance a codebook including at least two or more precoding vectors including a phase delay value for each transmission antenna connected to the phase shift network calculated by (Equation 3) below, $$\omega_i = \begin{bmatrix} 1 \\ e^{j\theta_2(i)} \\ \vdots \\ e^{j\theta_{N_{tx}}(i)} \end{bmatrix} \quad \text{(Equation 3)}$$

($w_i$: precoding vector, i: codebook number).

6. The channel estimation apparatus of claim 1, wherein the receiver comprises:

a reception communication module configured to perform frame synchronization to obtain predetermined beamforming information included in a frame transmitted from the transmitter, and receive transmission pilot signals from the transmitter using the obtained beamforming information;

a channel estimation module configured to, when the beamforming use of the transmitter is confirmed using the beamforming information obtained from the reception communication module, generate reception pilot signals based on the received transmission pilot signals and estimate a channel using the transmission pilot signals and the reception pilot signals;

an optimal precoding vector detection module configured to detect an optimal precoding vector to be applied to the transmitter from among precoding vectors included in a pre-stored codebook by using the channel information estimated by the channel estimation module;

a transmission/reception switching switch configured between the reception communication module and the single reception antenna to switch a transmission/reception state of the reception communication module for the single reception antenna;

a reception control module configured to switch a transmission/reception state of the reception communication module by controlling a switching operation of the transmission/reception switching switch; and a reception memory module configured to store in advance a codebook including at least two or more precoding vectors including a phase delay value for each transmission antenna connected to the transmitter calculated by the following (Equation 3), $$\omega_i = \begin{bmatrix} 1 \\ e^{j\theta_2(i)} \\ \vdots \\ e^{j\theta_{N_{tx}}(i)} \end{bmatrix} \quad \text{(Equation 3)}$$

($w_i$: precoding vector, i: codebook number).

7. The channel estimation apparatus of claim 6, wherein the channel estimation module comprises:

a reception pilot signal generation module configured to generate reception pilot signals by using beamforming information from the transmitter obtained by the reception communication module; and a calculation module configured to perform a channel estimation operation by the following (Equation 5) using transmission pilot signals from the transmitter received by the reception communication module and reception pilot signals generated by the reception pilot signal generation module, $$\sum_{n=0}^{N-1} \frac{1}{\rho} y(n) p^H(n) = \widehat{h_0^T} \quad \text{(Equation 5)}$$

($\widehat{h_0^T}$: estimated channel, $\rho$: constant for normalization, $p^H(n)$: a value obtained by performing a Hermitian operation on p(n), $$y(n) = \sum_{l=0}^{L-1} h_l^T p(n-l), \; h_l \in \mathbb{C}^{N_{tx} \times 1}, \; p(n) \in \mathbb{C}^{N_{tx} \times 1}:$$

a transmission pilot signal received from a single reception antenna, p(n): a pilot including samples of the transmission pilot signal of each transmission antenna vector, $h_l$: the channel vector of the l-th path among multipath channels).

8. The channel estimation apparatus of claim 6, wherein detecting an optimal precoding vector among precoding vectors included in a pre-stored codebook using the estimated channel information in the optimal precoding vector detection module is performed by the following (Equation 6), wherein phase shift information corresponding to the detected optimal precoding vector is transmitted to a transmitter through the reception communication module, $$i_{opt} = \arg\max_i \widehat{h_0^T} \omega_i \quad \text{(Equation 6)}$$

($i_{opt}$: codebook number indicating the optimal precoding vector, $\widehat{h_0^T}$: estimated channel, $w_i$: precoding vector, i: codebook number).

9. The channel estimation apparatus of claim 8, wherein the optimal precoding vector is a precoding vector that allows the receiver to receive the transmission signal from the transmitter with the highest power.

10. The channel estimation apparatus of claim 7, wherein the predetermined beamforming information comprises whether the transmitter uses beamforming, the number of transmission antennas, and a signal generation parameter for generating a Zadoff-Chu sequence.

11. The channel estimation apparatus of claim 3, wherein the transmission control module is configured to set the phase delay values of all phase shifters of the phase shift network as a predetermined initial phase delay value in an initial state in which a communication protocol is started.

12. The channel estimation apparatus of claim 8, wherein the phase shift information is a codebook number corresponding to the optimal precoding vector.

13. A channel estimation method for performing beamforming in a communication system using a single antenna-based standard, the method comprising:

an initial phase delay value setting step of setting phase delay values of all phase shifters configured in a phase shift network as a predetermined initial phase delay value in a transmitter to which the multiple transmission antenna is connected when the communication protocol is started;

a pilot signal generation step of generating a Zadoff-Chu sequence based on a predetermined signal generation parameter, and generating a predetermined number of transmission pilot signals equal to the number of the multiple transmission antennas using the generated Zadoff-Chu sequence; in the transmitter;

a pilot signal transmission step of transmitting the transmission pilot signals generated in the pilot signal generation step to the receiver, in the transmitter;

a frame generation step of generating a frame including predetermined beamforming information and transmitting the generated frame to a multiple transmission antenna through the phase shift network; in the transmitter;

a frame and pilot signal reception step of obtaining beamforming information included in the frame generated by the transmitter in the frame generation step through frame synchronization, and receiving the transmission pilot signals using the obtained beamforming information, in the receiver to which a single reception antenna is connected;

a channel estimation step of generating reception pilot signals based on the received transmission pilot signals and estimating a channel using the transmission and reception pilot signals in the receiver when the beamforming use of the transmitter is confirmed from the beamforming information obtained in the frame and pilot signal reception step;

an optimal precoding vector detection step of detecting an optimal precoding vector to be applied by a transmitter among precoding vectors included in a pre-stored codebook by using the channel information estimated in the channel estimation step, in the receiver;

a codebook number feedback step of feeding back a codebook number corresponding to the optimal precoding vector detected in the optimal precoding vector detection step to the transmitter through a single reception antenna, in the receiver; and a phase delay value conversion setting step of converting a signal phase of extracting the corresponding precoding vector from the codebook stored in advance using the codebook number fed back from the receiver through the codebook number feedback step, and converting a signal phase of each transmission antenna into a phase delay value corresponding to each transmission antenna included in the extracted precoding vector, in the transmitter.

14. The method of claim 13, wherein the pilot signal generation step comprises:

a switch control step of controlling a signal switching switch configured between a transmission communication module and a pilot signal generation module and a phase shift network to connect the pilot signal generation module to the phase shift network;

a Zadoff-Chu sequence generation step of generating a Zadoff-Chu sequence by the following (Equation 1) based on a predetermined signal generation parameter after the pilot signal generation module is connected to the phase shift network by the switch control step; and a transmission pilot signal generation step of generating the same number of transmission pilot signals as the number of transmission antennas by the following (Equation 2) based on the Zadoff-Chu sequence generated in the Zadoff-Chu sequence generation step, $$z_q(k) = e^{-j\pi q \frac{k(k+1)}{N_{ZC}}}, k = 0, 1, 2, \ldots, N_{ZC} - 1 \quad \text{(Equation 1)}$$

($z_q(k)$: Zadoff-Chu sequence generated based on signal generation parameters, k: sample order of the sequence, $N_{ZC}$: length of the generated sequence (signal), q: a variable that determines the characteristics of the sequence using a prime number smaller than $N_{ZC}$)

$$p_n(k) = z_q(\{k - n\lfloor N_{zc}/N_{tx}\rfloor\} \bmod N_{zc}), \quad \text{(Equation 2)}$$
$$k = 0, 1, \ldots N_{zc} - 1, n = 0, 1, \ldots N_{tx} - 1$$

($p_n(k)$: transmission pilot signal of the n-th transmission antenna generated based on the Zadoff-Chu sequence, $\lfloor \ \rfloor$: rounding down operation, $N_{tx}$: total number of transmission antennas connected to the phase shift network).

15. The method of claim 13, wherein the frame and pilot signal reception step comprises:

a beamforming information acquisition step of acquiring beamforming information by estimating a start part of a frame from a transmitter through frame synchronization; and a transmission pilot signal reception step of receiving transmission pilot signals in the pilot signal transmission step using the beamforming information acquired in the beamforming information acquisition step.

16. The method of claim 15, wherein the channel estimation step comprises:

a reception pilot signal generation step of generating reception pilot signals using a signal generation parameter for generating a Zadoff-Chu sequence included in beamforming information obtained from the frame of the transmitter; and a calculation step of generating the reception pilot signals and then performing an operation of estimating a channel by the following (Equation 5) using the transmission pilot signals from the transmitter and the generated reception pilot signals, $$\sum_{n=0}^{N-1} \frac{1}{\rho} y(n) p^H(n) = \hat{h}_0^T \quad \text{(Equation 5)}$$

($\hat{h}_0^T$: estimated channel, ρ: constant for normalization, $p^H(n)$: a value obtained by performing a Hermitian operation on p(n), $$y(n) = \sum_{l=0}^{L-1} h_l^T p(n-l), \; h_l \in \mathbb{C}^{N_{tx} \times 1}, \; p(n) \in \mathbb{C}^{N_{tx} \times 1}:$$

a transmission pilot signal received from a single reception antenna, p(n): a pilot including samples of the transmission pilot signal of each transmission antenna vector, $h_l$: the channel vector of the l-th path among multipath channels).

17. The method of claim 13, wherein in the optimal precoding vector detection step, detecting the optimal precoding vector from among the precoding vectors included in the pre-stored codebook using the estimated channel information is performed by the following (Equation 6), wherein the optimal precoding vector is a precoding vector that allows the receiver to receive the transmission signal from the transmitter with the highest power, $$i_{opt} = \arg\max_i \hat{h}_0^T w_i \quad \text{(Equation 6)}$$

($i_{opt}$: codebook number indicating the optimal precoding vector, $\hat{h}_0^T$: estimated channel, $w_i$: precoding vector, i: codebook number).

18. The method of claim 16, wherein the predetermined beamforming information comprises whether the transmitter uses beamforming, the number of transmission antennas, and a signal generation parameter for generating a Zadoff-Chu sequence.

19. The method of claim 17, wherein the codebook comprises at least two precoding vectors including a phase delay value for each transmission antenna connected to the transmitter calculated by the following (Equation 3), $$\omega_i = \begin{bmatrix} 1 \\ e^{j\theta_2(i)} \\ \vdots \\ e^{j\theta_{N_{tx}}(i)} \end{bmatrix} \quad \text{(Equation 3)}$$

($w_i$: precoding vector, i: codebook number).

* * * * *